(12) United States Patent
Edwards

(45) Date of Patent: Sep. 24, 2013
(10) Patent No.: US 8,540,907 B2

(54) METHODS FOR PRODUCING OPHTHALMIC LENS MOLDS AND MOLDED OPHTHALMIC LENSES

(75) Inventor: David Edwards, Southampton (GB)

(73) Assignee: CooperVision International Holding Company, LP, St. Michael (BB)

( * ) Notice: Subject to any disclaimer, the term of this patent is extended or adjusted under 35 U.S.C. 154(b) by 1241 days.

(21) Appl. No.: 11/781,126

(22) Filed: Jul. 20, 2007

(65) Prior Publication Data

US 2008/0018008 A1    Jan. 24, 2008

Related U.S. Application Data

(60) Provisional application No. 60/820,213, filed on Jul. 24, 2006.

(51) Int. Cl.
    B29B 11/00    (2006.01)
    B29C 33/10    (2006.01)
    B29C 45/34    (2006.01)
    B29D 11/00    (2006.01)

(52) U.S. Cl.
    USPC .............................. 264/2.5; 264/1.1; 425/546

(58) Field of Classification Search
    USPC ................................................. 425/401, 812
    See application file for complete search history.

(56) References Cited

U.S. PATENT DOCUMENTS

| | | | |
|---|---|---|---|
| 4,778,632 A | | 10/1988 | Bakalar |
| 4,828,769 A | * | 5/1989 | Maus et al. ................... 264/1.31 |
| 5,073,098 A | | 12/1991 | Mishima |
| 5,313,541 A | * | 5/1994 | Lalaouna et al. ............... 385/78 |
| 5,702,735 A | | 12/1997 | Martin et al. |

(Continued)

FOREIGN PATENT DOCUMENTS

| | | |
|---|---|---|
| DE | 298 15 545 U1 | 12/1998 |
| JP | 08-39626 | 2/1996 |
| JP | 11-90609 | 4/1999 |

OTHER PUBLICATIONS

Eckert Uhlmann, Sascha Piltz, Ulrich Doll, Machining of micro/miniature dies and moulds by electrical discharge machining—Recent development, Journal of Materials Processing Technology, vol. 167, Issues 2-3, 2005 International Forum on the Advances in Materials Processing Technology, Aug. 30, 2005, pp. 488-493.*

(Continued)

*Primary Examiner* — Benjamin Schiffman
(74) *Attorney, Agent, or Firm* — Klein, O'Neill & Singh, LLP (57) ABSTRACT

Devices, systems, and methods for producing ophthalmic lens molds and molded ophthalmic lenses are described. The present devices, systems, and methods provide venting of gases produced during injection molding of ophthalmic lens molds. With the present devices, systems, and methods, improvements in mold quality, lens quality, mold quality consistency, and lens quality consistency can be achieved compared to existing injection molding devices, systems, and methods. An optic power insert bushing is described and includes a venting system that directs gas from a first end of the bushing toward a second end of the bushing. The gas is directed between an optic power insert and an inner sidewall surface of a bushing bore in which the optic power insert is located. The bushing or bushings, and optic power inserts, can be provided as components of an ophthalmic lens mold injection system. Methods of making and using the vented bushings are also described.

18 Claims, 4 Drawing Sheets

(56) References Cited

U.S. PATENT DOCUMENTS

| | | | |
|---|---|---|---|
| 5,733,585 | A | 3/1998 | Vandewinckel et al. |
| 5,861,114 | A | 1/1999 | Roffman et al. |
| 5,968,422 | A | 10/1999 | Kennedy |
| 6,352,659 | B1 | 3/2002 | Clark et al. |
| 2003/0062640 | A1 | 4/2003 | Ansell et al. |
| 2003/0164565 | A1 | 9/2003 | O'Brien |
| 2003/0175379 | A1* | 9/2003 | Sudo et al. .................. 425/542 |
| 2003/0203066 | A1 | 10/2003 | Lust et al. |
| 2006/0145369 | A1 | 7/2006 | Lawton et al. |
| 2006/0222808 | A1* | 10/2006 | Pickutoski et al. .......... 428/64.4 |

OTHER PUBLICATIONS

Herbert Rees, Mold Engineering, 2002, Hanser, 2nd ed., 189-195.*
Extended European Search Report completed Nov. 2, 2007 from corresponding EP Application No. 07014474.6 and Extended European Search Report mailed Nov. 27, 2007 (7 pages).
PCT International Search Report completed Dec. 14, 2007 and mailed Feb. 19, 2008 from corresponding PCT Application No. PCT/US07/74124 filed Jul. 23, 2007 (3 pages).
PCT Written Opinion of the International Searching Authority completed Dec. 14, 2007 and mailed Feb. 19, 2008 from corresponding PCT Application No. PCT/US07/74124 filed Jul. 23, 2007 (6 pages).
Office Action dated Sep. 6, 2010 from corresponding Japanese Application No. 2007-214140 (2 pages).
English Translation of Office Action dated Sep. 6, 2010 from corresponding Japanese Application No. 2007-214140 (2 pages).
Office Action dated Sep. 6, 2010 from corresponding Taiwanese Application No. 096126951 (7 pages).
English Translation of Office Action dated Sep. 6, 2010 from corresponding Taiwanese Application No. 096126951 (4 pages).

* cited by examiner

METHODS FOR PRODUCING OPHTHALMIC LENS MOLDS AND MOLDED OPHTHALMIC LENSES

CROSS-REFERENCE TO RELATED APPLICATIONS

This application claims the benefit of U.S. Application No. 60/820,213, filed Jul. 24, 2006, the entire contents of which are hereby expressly incorporated herein by reference.

FIELD

The present invention relates to the manufacture of ophthalmic lens molds and molded ophthalmic lenses obtained therefrom. More particularly, the present invention relates to vented bushings for optic power inserts for injection molding ophthalmic lens molds, and injection molding systems comprising the vented bushings, and methods of manufacturing lens molds and ophthalmic lenses using the vented bushings.

BACKGROUND

Soft hydrogel ophthalmic lenses, such as contact lenses, can be produced by polymerizing or curing a polymerizable lens precursor composition in a lens mold. Lens molds used in the molding of ophthalmic lenses, such as cast molding of contact lenses, typically comprise a first mold member and a second mold member. The first mold member and second mold member are put in contact with each other to form a lens shaped cavity containing the polymerizable lens precursor composition. The first mold member can be understood to be a female mold member or a mold member having a concave lens defining surface (e.g., a concave molding surface) that forms the front surface or anterior surface of the ophthalmic lens. The first mold member can also be understood to be a front curve mold member. The second mold member can be understood to be a male mold member or a mold member having a convex lens defining surface (e.g., a convex molding surface) that forms the back surface or posterior surface of the ophthalmic lens. The second mold member can also be understood to be a back curve mold member.

The first mold member and the second mold member can comprise a thermoplastic material that is capable of being injection molded. In other words, the first mold member and the second mold member can be produced by injection molding a thermoplastic material into mold member cavities. Examples of thermoplastic materials used to produce the first mold member and the second mold member include, without limitation, polypropylene materials, polystyrene materials, polyethylene materials, and materials comprising ethylene vinyl alcohol polymers or polyvinyl alcohol polymers.

The lens-defining surfaces of the first mold member and the second mold member are shaped by inserts provided or mounted in an injection molding machine or a component of an injection molding machine. These inserts are formed from metal materials, such as steel, brass, copper, chromium, cobalt-nickel, alloyed martensitic steel, and the like. The inserts are machined and include an optical quality surface that defines an optical surface or the lens-defining surface of an ophthalmic lens mold member. The optical quality surface of the inserts can be machined to provide a lens mold member having a molding surface effective to produce an ophthalmic lens with a desired optical power, and therefore, the inserts can be understood to be power inserts or optic power inserts. In other words, an optic power insert, as used herein, refers to an insert of an ophthalmic lens mold injection molding system that comprises a surface that forms a lens-defining surface of an ophthalmic lens mold. The optic power inserts can be one piece inserts or two-piece inserts. The optic power inserts of existing systems and methods are placed in bushings that have a smooth internal bore or an internal bore defined by a sidewall that has an uncorrugated surface or a curviplanar surface. As used herein, a curviplanar surface refers to a curved surface, such as an interior sidewall surface of a cylinder, that can be theoretically flattened onto a single plane. Conventional bushings accommodate the optic power inserts in the smooth internal bore in a sealed configuration.

Injection molding of ophthalmic lens mold members includes directing a molten thermoplastic material into a cavity that includes the optical quality surface of the optic power inserts. During the procedure, gases are released from the thermoplastic material. The released gases result in an increase in pressure within the mold cavity. As described in U.S. Publication No. 20030164565, some two piece steel injection mold inserts have a zero vent design that eliminates a vent. Other inserts and injection molding systems include one or more vents located on a plane that is orthogonal to the length or longitudinal axis of the insert. For example, U.S. Pat. No. 5,540,410 states vent holes are disposed at angles 20° to 30° off of a diameter of the concavo-convex mold portion defined by the thermoplastic injection point and the convergence point of the thermoplastic resin. U.S. Pat. Nos. 5,545,366; 5,702,735; and 5,861,114 describe the use of one ejector pin located at the opposite side of a hot runner gate to vent gas. However, when no vents are provided, or when one or more vents are provided as described above, gas pressure build-up still remains a problem. For example, the increased gas pressure can result in a tilting of the optic power insert or decentration of the optic power insert. Changes in the optic power insert position negatively affects the ophthalmic lens molds produced with the optic power inserts. For example, positional changes can alter the shape of the lens mold and thereby affect the power of the lens produced with the lens mold, affect a toric axis of the lens mold and the lens obtained therefrom, and can create bubbles in the lens mold which can affect the quality of the lenses obtained therefrom. The increased gas pressure over time results in a decrease of lens mold quality and lens mold quality consistency and therefore reduced ophthalmic lens quality and quality consistency, and further results in increased manufacturing time, effort, and costs.

In addition, residual components, such as volatile agents and the like, that are present in the gas can accumulate at or near the contact region of the optic power inserts and the curviplanar surface of the bushing. As the amount of residual components increases, the ability to remove the optic power inserts from the bushing becomes difficult leading to an increase in manufacturing time and increased costs and effort in the production of ophthalmic lens molds and molded ophthalmic lenses.

Thus, there remains a need for new devices, systems, and methods for injection molding ophthalmic lens molds with improved quality and quality consistency among ophthalmic lens molds and molded ophthalmic lenses obtained therefrom. In view of the above, it can be appreciated that an existing problem relates to improving the quality and quality consistency of injection molded ophthalmic lens molds and molded ophthalmic lenses obtained therefrom.

SUMMARY

The present devices, systems, and methods attempt to address these and other needs and problems. The present devices, systems, and methods, reduce the build-up or increase of gas pressure and residual component accumulation resulting from an ophthalmic lens mold injection molding method. The present devices, systems, and methods include a venting system that effectively vents gas produced during an injection molding procedure while maintaining positional stability of optic power inserts of an injection molding system. With the venting system of the present devices, systems, and methods, improvements in lens mold quality and quality consistency, lens quality and quality consistency, or both, compared to existing injection molding systems and methods, can be achieved. For example, with the present devices, systems, and methods, reductions in molding events can be achieved, such as reductions in bubble formation in ophthalmic lens molds, reductions in power spreads in ophthalmic lens molds, reductions in toric axis alignment errors, reductions in residual toricity, and the like. As understood by persons of ordinary skill in the art, power spread can be understood to be the term used to describe the range of variation of measured spherical power or other optical power (diopters) of a batch of contact lenses or a plurality of contact lenses, around or relative to an average value or average optical power for that batch of contact lenses. Residual toricity refers to a surface distortion effect of a molded contact lens resulting from uneven shrinkage of plastic molds used to form the contact lens. The residual toricity is linked or related to flow and cooling properties of the plastic material used in the lens mold forming process. Residual toricity can be detected by observing or examining asymmetric power profiles over a lens surface. In addition, with the venting system of the present devices, systems, and methods, the life of the optic power inserts can be increased compared to optic power inserts of existing ophthalmic lens injection molding systems, and manufacturing time can be improved by reducing the accumulation of residual components between an optic power insert and bushings in which the inserts are located.

Certain aspects of the present invention relate to optic power insert bushings. The present optic power insert bushings include a bore that is structured, such as sized and shaped, to accommodate an optic power insert. A venting system is provided in the bushing. The venting system directs gas from a first end of the bushing toward a second end of the bushing along the length of the bushing and between an optic power insert located in the bushing and an interior sidewall surface surrounding the bore.

In one embodiment, an optic power insert bushing comprises, consists essentially of, or consists entirely of a unitary or monolithic body member. The body member includes a first end, a second end, and a length extending from the first end to the second end. A bore is provided in the body member. The bore is dimensioned to accommodate an optic power insert. The bore extends from the first end to the second end of the body member, and is surrounded by an interior sidewall surface. The interior sidewall surface is corrugated, ridged, or grooved. For example, the interior sidewall surface can include a plurality of channels, such as microchannels, that are oriented parallel to each other and that extend along the majority of the length of the body member. The channels are structured to provide release of gas during an injection molding procedure, and the interior sidewall surface is structured to contact the optic power insert and reduce lateral movement of the optic power insert relative to the body member.

Another aspect of the present invention relates to the combinations of optic power insert bushings and optic power inserts. The optic power inserts can be one piece inserts or two-piece inserts.

Another aspect of the present invention relates to methods of producing optic power insert bushings. The methods include forming a venting system on or in the bushing so that when an optic power insert is located in a bore of the bushing, gas produced in an injection molding procedure can be effectively vented from a mold cavity with little, and preferably no, positional changes in the optic insert.

Yet another aspect of the present invention relates to the use of the optic power insert bushings. For example, an embodiment of the present invention relates to a methods of producing an ophthalmic lens mold using the present optic power insert bushings. Another embodiment of the present invention relates to methods of producing ophthalmic lenses, such as contact lenses, using ophthalmic lens molds produced using the present optic power insert bushings.

Various embodiments of the present invention are described in detail in the detailed description and additional disclosure below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following detailed description, drawings, and additional disclosure.

DETAILED DESCRIPTION

New devices, systems, and methods for producing ophthalmic lens molds and molded ophthalmic lenses have been invented. The present devices, systems, and methods improve the quality or quality consistency of ophthalmic lens molds, and the quality or quality consistency of molded ophthalmic lenses obtained therefrom compared to existing and previously described injection molded ophthalmic lens molds and molded lenses. For example, with the present devices, systems, and methods, increases in gas pressure resulting from injection molding of ophthalmic lens molds can be reduced or prevented by venting the gas from a mold cavity of an injection molding system. With the present devices, systems, and methods, an increase in gas pressure, which would cause decentering or other positional changes of optic power inserts in conventional injection molding systems, can be avoided. Therefore, with the present devices, systems, and methods, positional misalignment, such as decentering, of optic power inserts is reduced or eliminated. By maintaining the positional stability of the optic power inserts, undesirable molding events can be reduced or eliminated. For example, with the present devices, systems, and methods, it is possible to reduce at least one of bubble formation in ophthalmic lens molds, power spreads in ophthalmic lens molds, toric axis misalignment in ophthalmic lens molds, residual toricity in ophthalmic lens mold, flashing of polymerized ophthalmic lens material produced in ophthalmic lens molds, and coupling or "stickiness" between a removable optic power insert and bushing in which the insert is located.

The present devices, systems, and methods are used in the production of ophthalmic lens molds and molded ophthalmic lenses obtained therefrom. The ophthalmic lens molds produced with the present devices, systems, and methods, comprise, consist essentially of, or consist entirely of, a thermoplastic material, for example a thermoplastic polymeric resin. Examples of suitable thermoplastic materials include polar and non-polar resins. For example, mold materials can include polystyrene, polypropylene, polyethylene, ethylene vinyl alcohol, poly vinyl alcohol, and combinations thereof. In certain embodiments, the lens molds are formed from polypropylene resins or ethylene vinyl alcohol resins.

The ophthalmic lens mold members produced with the present devices, systems, and methods, include a lens defining surface or a molding surface. This lens defining surface can be understood to be an optical quality surface. For example, the surface is sufficiently smooth to form a lens surface that does not irritate an eye of a patient. In certain embodiments, the lens defining surface or molding surface has a surface roughness having an average amplitude less than 50 nanometers RMS. In further embodiments, the average amplitude of the surface roughness of the molding surface is less than about 40 nanometers RMS, or even less than 20 nanometers RMS, or even less than 10 nanometers RMS. In certain embodiments, the molding surface has a surface roughness with an amplitude less than about 4 nanometers RMS. The surface roughness can be due to the presence of surface structures or periodic structures or defects transferred from a machined optical quality surface of an optic power insert. When the lens defining surface of the ophthalmic lens mold member is concave, the lens defining surface of the mold member can be understood to be a front curve surface that defines an anterior surface of the lens. Or, the mold can be understood to be a female mold member. When the lens defining surface of the ophthalmic lens mold member is convex, the lens defining surface of the mold member can be understood to be a back curve surface that defines a posterior surface of the lens. Or, the mold can be understood to be a male mold member. The male and female mold members can be placed in contact with each other to form an ophthalmic lens mold having a lens shaped cavity. A polymerizable lens precursor composition is placed in the cavity, and the composition is cured using radiation, such as thermal radiation or ultraviolet radiation, to produce a molded ophthalmic lens.

The ophthalmic lenses produced with the present devices, systems, and methods, are preferably contact lenses, and for purposes of convenience, the majority of this description will relate to contact lenses and contact lens molds produced with the present devices, systems, and methods. However, it can be understood that the present devices, systems, and methods can be used in the production or manufacture of other molded ophthalmic lenses, including corneal onlay lenses, corneal inlay lenses, intraocular lenses, and the like. The present devices, systems, and methods may provide one or more benefits in the production of certain types of molded contact lenses. For example, toric contact lenses, such as contact lenses that include a toric optical zone, including either a back surface toric optical zone or a front surface toric optical zone, can benefit from the present devices, systems, and methods. In addition, silicone hydrogel contact lenses, which can be spherical lenses or aspherical lenses, and can include a toric optical zone, a rotational stabilization structure, or other features, can also benefit from the present devices, systems, and methods. As one example, the present devices, systems, and methods are useful in the production of rotationally stabilized silicone hydrogel contact lenses, including silicone hydrogel contact lenses that include a prism ballast, a periballast, superior and inferior thin zones, and the like. By improving the quality and quality consistency of contact lens molds used to produce contact lenses with complicated structures, such as toric contact lenses, and/or the quality and quality consistence of contact lens molds used to produce contact lenses formed from expensive chemical materials, substantial savings in terms of time, effort, and money can be achieved with the present devices, systems, and methods. For example, using conventional injection molding devices, systems, and methods, it may only be possible to produce a batch of contact lens molds with an acceptability rating of about 50%. In comparison, with the present devices, systems, and methods, more than 80%, such as at least 90%, or at least 95% of the contact lens molds satisfy quality control requirements, and are acceptable for the molding of contact lenses.

As described herein, devices, systems, and methods have been invented which provide improvements in venting of gases resulting from an injection molding procedure of ophthalmic lens molds. By effectively venting injection molding gases, gas pressure increases in the mold cavity are reduced or eliminated, and positional stability of an ocular insert used to form a lens-defining surface of the ophthalmic lens mold is increased.

In one aspect, the present invention relates to an optic power insert bushing that includes a venting system. Examples of the present optic power insert bushings are illustrated in the accompanying drawings.

An optic power insert bushing, in accordance with the disclosure herein, comprises a first end, a second end, and a length extending from the first end to the second end. The bushing comprises a bore surrounded by or defined by an interior sidewall surface. The bore is structured, such as sized and shaped, to accommodate an optic power insert. The bushing also comprises a venting system that is structured or otherwise configured to direct gas from the first end of the bushing toward the second end of the bushing between an optic power insert located in the bore and the interior sidewall surface.

As used herein, a bushing refers to an element, such as a body member, that accommodates or is structured to receive an optic power insert. For example, an optic power insert can be passed or directed into and/or out of the bushing. Thus, a bushing, as used herein, comprises a bore to accommodate an optic power insert. The bore can be understood to be a hole or passage to contain the optic power insert. The bore has a cross-sectional distance, such as a diameter for cylindrical bushings as shown in the accompanying drawings, that is substantially equal to an outer cross-sectional distance, or outer diameter for cylindrical optic power inserts, of an optic power insert. For example, the diameter of the bore should be slightly greater than the outer diameter of the optic power insert so that the insert can be passed into or out of the bore of the bushing, but also so that the optic power insert contacts at least a portion of the inner sidewall surface defining the bore.

Figure 1:
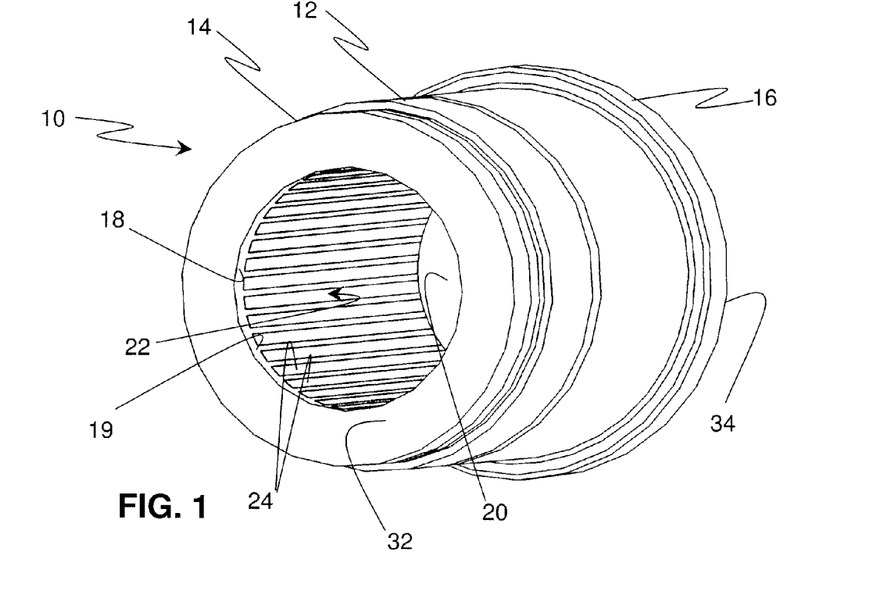
FIG. 1 is an illustration of a perspective view of a optic power insert bushing.
Figure 2:
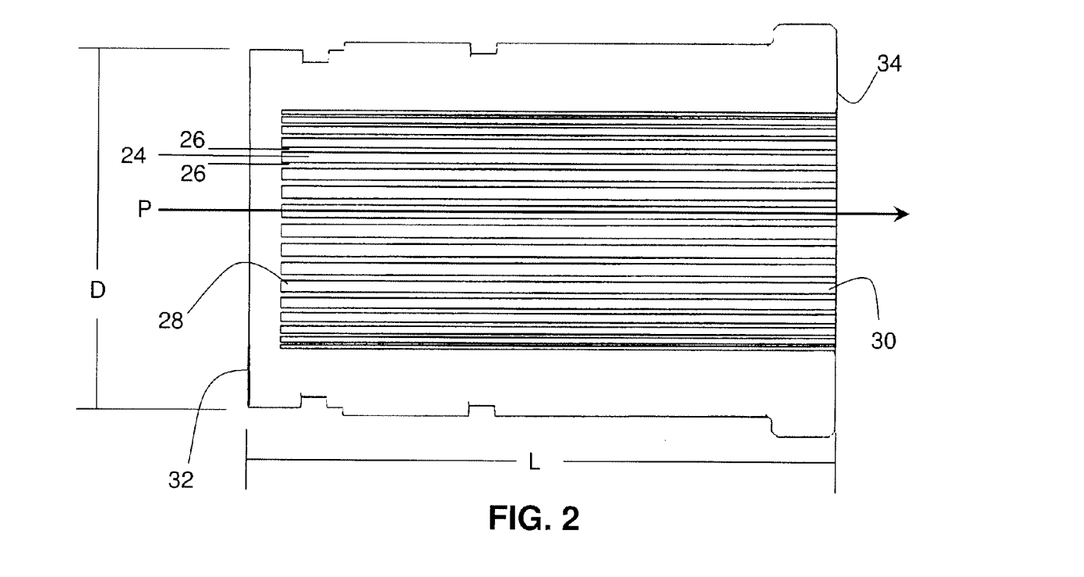
FIG. 2 is an illustration of a sectional view of the optic power insert bushing of FIG. 1.
Figure 9A:
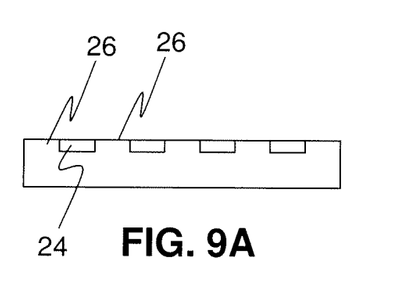
FIGS. 9A-9C are illustrations of sectional views of different channel configurations of the venting system of the present bushings.

In reference to FIGS. 1-4, an optic power insert bushing 10 comprises, consists essentially of, or consists entirely of a unitary or monolithic body member 12. The bushing 10 has a first end 14 and a second end 16, and has a length L extending from the first end 14 to the second end 16. As shown in FIG. 2, the bushing 10 also has a cross-sectional distance D that is orthogonal to the bushing length L. The distance D is typically shorter than the length L. The bushing 10 has an interior sidewall 18 defining a bore 20. The interior sidewall 18 has an interior sidewall surface 19. A venting system 22 is provided on or in the interior sidewall 18. In the illustrated embodiment, the venting system 22 comprises, consists essentially of, or consists entirely of, a plurality of venting channels 24 in the interior sidewall surface 19. Each venting channel 24 is located between a first interior sidewall surface portion 26, and a second interior sidewall surface portion 26 (also see FIG. 9A). The venting channels 24 have a first end 28 that is located near the first end surface 32 of the bushing, and a second end 30 that is located near the second end surface 34 of the bushing. The venting channel first end 28 is spaced apart from first end surface 32, whereas venting channel second end 30 terminates at second end surface 34. A venting path P is represented by the arrow extending along a longitudinal axis of the bushing.

Figure 10A:
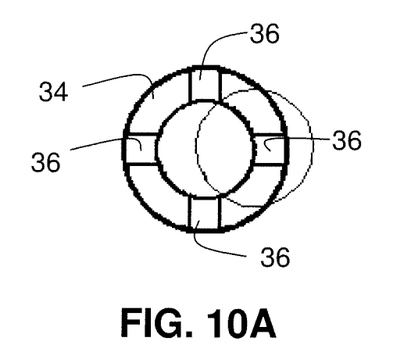
FIG. 10A is a plan view of the second end surface of an embodiment of the present optic power insert bushings.
Figure 10B:
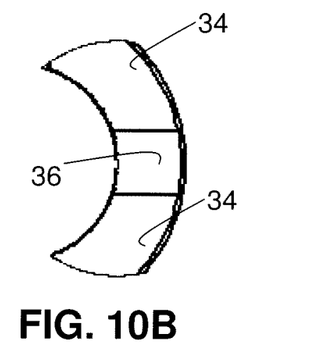
FIG. 10B is a magnified plan view of the circled region of FIG. 10A.

The second end surface 34 can be planar, if desired, or as shown in FIGS. 10A and 10B, the second end surface 34 can include a plurality of end channels 36 formed therein. As shown in the embodiment of FIG. 10A, the second end surface 34 of the bushing has four end channels 36. Each of the end channels 36 is oriented about ninety degrees relative to an adjacent end channel. Each of the end channels 36 has a length that is substantially orthogonal to the length of the venting channels 24.

It can be understood, that embodiments of the present bushings, including the illustrated embodiments, differ from conventional or previously described bushings by including a non-curviplanar interior sidewall surface circumscribing the bore of the bushing. In comparison, existing bushings have a curviplanar interior sidewall surface, and do not include a venting system that directs gas along the length of the bushing between an optic insert located in the bushing and the interior sidewall surface. It can be understood that a curviplanar surface of existing bushings would be a surface lying in a single plane if the curviplanar surface were flattened. The interior sidewall surface of embodiments of the present bushings is a non-curviplanar surface. For example, if the interior sidewall surface of the present bushings were flattened or extended, the surface would not lie in a single plane. Instead, the surface includes a plurality of surface portions that lie in a first plane, and a plurality of surface portions that lie in a second plane spaced apart from the first plane. As described herein, the interior sidewall surface of the present bushings can comprise a plurality of channels. The channels can have a bottom surface, which can be understood to correspond to one of the surface portions lying in a plane, such as surface portions lying in the first plane described above, and each channel is located between two surface portions lying in a second plane that is spaced apart from the bottom surface of the channels. Furthermore, the channels each comprises at least two channel side walls positioned between the first plane and the second plane, which may be viewed as lying on a third plane. Thus, the interior sidewall surface of the present bushings may be viewed as having at least three planes.

Figure 9B:
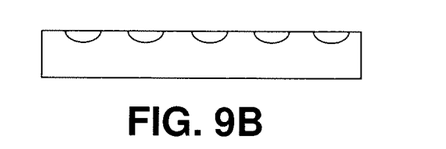
Figure 9C:
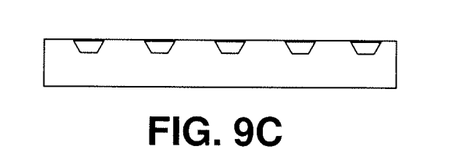

Thus, it can be understood that embodiments of the present bushings comprise a venting system that comprises a plurality of channels in the interior sidewall surface of the bushing. The channels can have any cross-sectional shape that is effective in permitting gas from an injection molding procedure to be vented from a mold cavity along the length of the bushing. For example, the channels can have cross-sectional shapes that include one or more planar surfaces, one or more curved surfaces, and combinations thereof. In the illustrated embodiments, the channels have rectangular cross-sectional shapes but with only three sides (see FIG. 9A), or in other words, the channels include first and second parallel surfaces, and a third surface in contact with the first and second surfaces, the third surface oriented at a ninety degree angle relative to the first and second surfaces. In other embodiments, the channels can have a semi-circular cross-sectional shape (FIG. 9B), or can comprise three or more planar surfaces, any two of which defining an angle greater than ninety degrees (FIG. 9C).

The present channels have a depth sufficient to permit venting of gas without substantial residual component buildup, such as accumulation of volatile chemical agents that may be present in the gas. Typically, the depth of the channels is on the order of micrometers, and thus, the channels can be referred to as microchannels. In certain embodiments, the maximum depth of the channels is no greater than 200 micrometers. For example, embodiments of the present bushings may comprise channels having a maximum depth from about 1 micrometer to about 200 micrometers. In certain embodiments, the channels have a depth less than about 100 micrometers. For example, in certain embodiments, the channels have a maximum depth less than about 20 micrometers. As a further example, the maximum depth of the channels may be from about 1 micrometer to about 15 micrometers. In certain embodiments, including the embodiment illustrated in FIGS. 1-4, the channels have a maximum depth from about 6 micrometers to about 8 micrometers. In additional embodiments, the channels have a maximum depth of about 15 micrometers.

In addition, the venting channels of the present bushings may also have a maximum width from about 1 micrometer to about 200 micrometers. Typically, the width of the venting channels will vary based on the depth of the venting channels.

As described herein, and as illustrated in FIGS. 2 and 9A-9C, each of the plurality of channels can be located between a first interior sidewall surface and a spaced apart second interior sidewall surface. For example, in reference to FIGS. 2 and 9A a venting channel 24 is located between first and second interior sidewall surfaces 26. In addition, embodiments of the present bushings comprise a plurality of channels that are parallel to each other and extend from near the first end 14 of the bushing to the second end 16 of the bushing. These channels can be understood to be longitudinal parallel venting channels.

The channels 24 of the present bushings can be eroded or machined channels formed in the interior sidewall 18 of the bushing 10. For example, a bushing may comprise a curviplanar interior sidewall surface and then a plurality of channels can be formed in the interior sidewall by machining or eroding portions of the interior sidewall. Embodiments of the present bushings comprise channels that are selected from the group consisting of electrical discharge machined channels, wire eroded channels, acid eroded channels, and combinations thereof. In additional embodiments, other types of channels can be provided in the bushing, such as other types of machined channels and the like. In the illustrated embodiment, the channels are wire eroded channels.

As understood by persons of ordinary skill in the art, electrical discharge machining can be referred to as spark machining, and includes removing electrically conductive materials by delivering electrical discharges to a surface of the materials. The electrical discharges are created by an electrode device to remove small amounts of material that are flushed from the working environment. Repeated delivery of the discharges creates progressively deeper voids or cavities until the desired shape or channel is produced. The electrode can be a graphite electrode, a wire electrode, or other similar electrode. The procedures can be performed in a liquid, such as water or other liquid, to facilitate removal of the small amounts of machined material and to cool the working environment.

At least one feature associated with the present bushings is the ability to vent gas from a mold cavity while maintaining positional stability of an optic power insert located in the bushing. For example, an optic power insert can be slidably disposed within a bushing so that the optic power insert can be slid along the length of the bushing. In addition, the optic power insert should exhibit minimal or no lateral movement when located in the bushing. At least, any movement should not negatively affect the quality or quality consistency of ophthalmic lens molds produced with the optic insert and bushing. Thus, in embodiments of the present bushings, an optic power insert is provided in the bushing and the optic power insert contacts a portion of the interior sidewall surface and remains in a laterally fixed position when the optic power insert is located in the bore of the bushing. For example, the optic power insert should not move in a direction that is not parallel to the longitudinal axis of the bushing or optic power insert.

Reduced lateral movement of the optic power insert can be achieved by providing sufficient contact surface area between the optic power insert and the interior sidewall surface of the bushing. For example, in certain embodiments of the present bushings, the optic power insert contacts at least 30% of the surface area of the interior sidewall surface when the optic power insert is located in the bore. In additional embodiments, including the illustrated embodiments, the optic power insert contacts from about 50% to about 60% of the surface area of the interior sidewall surface when the optic power insert is located in the bore. In certain embodiments, the optic power insert contacts from about 40% to about 60% of the surface area of the interior sidewall. The percent of contact relates to the size of the bore and the size of the venting channels. For example, a bushing having a bore diameter of 25.4 mm may have a surface area contact of about 47%, a bushing having a bore diameter of 20.0 mm may have a surface area contact of about 51%, and a bushing having a bore diameter of 14.9 mm may have a surface area contact of 57%. In addition, the percent of the interior sidewall occupied by venting channels can be from about 40% to about 60%. The contact surface area can be determined as a percentage by determining the surface area of the contacting portion of the interior sidewall surface and the surface area of the bottom surface of the channels, and dividing the contacting portion surface area by the sum of the two surface areas. In certain embodiments, the width of the venting channels is at least about five times greater than the depth of the channels. For example, the width of the venting channels can be at least ten times greater than the depth of the channels, or even at least twenty times greater than the depth of the channels. For channels having a maximum depth from about six micrometers to about eight micrometers, the width of the channels may range from about thirty micrometers to about one hundred sixty micrometers.

Figures 3, 4, 5:
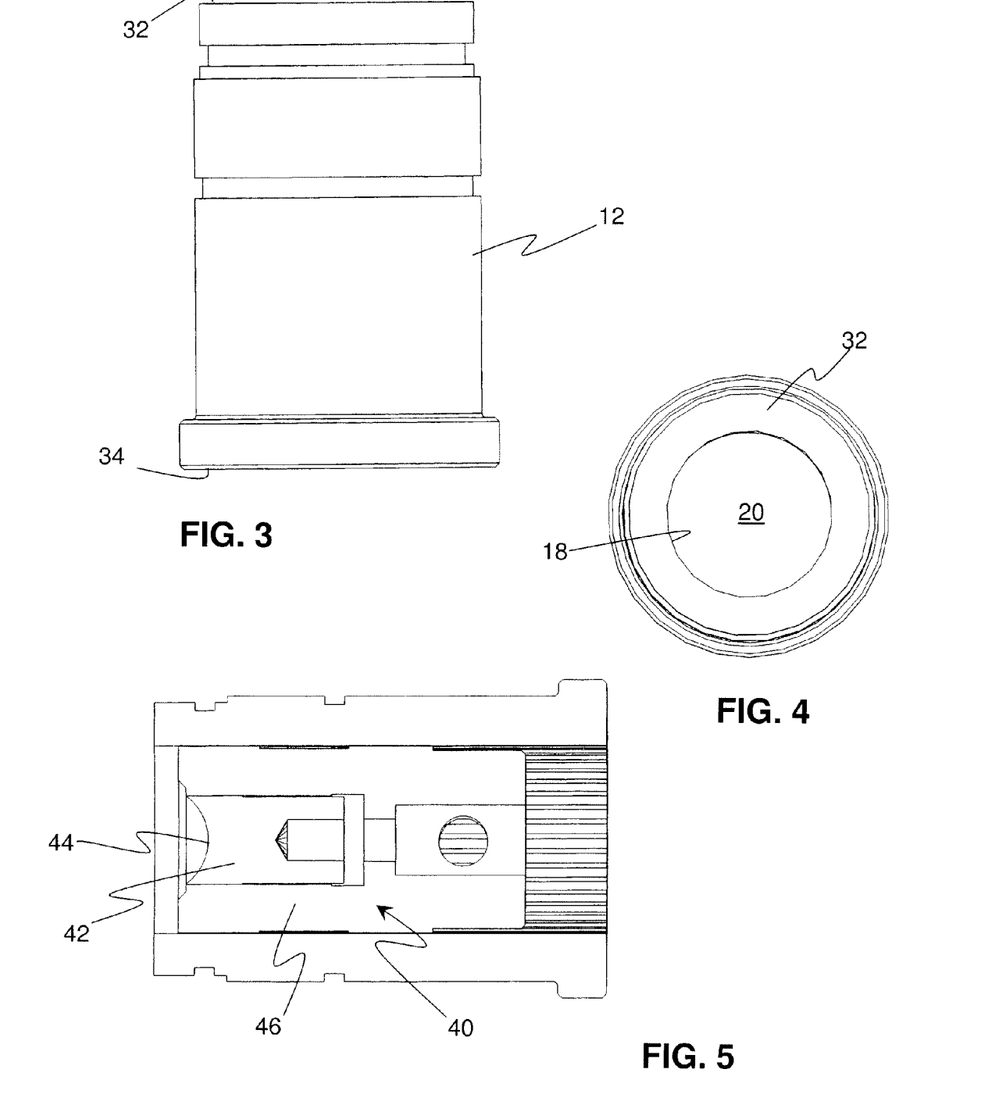
FIG. 3 is an illustration of a side plan view of the optic power insert bushing of FIG. 1.
FIG. 4 is an illustration of a plan view of a first end of the optic power insert bushing of FIG. 1.
FIG. 5 is an illustration of a sectional view of the optic power insert bushing of FIG. 1 and a two-piece optic power insert located in the bore of the bushing.

Another aspect of the present invention relates to a combination of the present bushings and an optic power insert located in the bore of the bushing. The optic power inserts can be one piece inserts or two piece inserts. For example, as shown in FIG. 5, the optic power insert 40 is a two piece insert. For example, the optic power insert 40 comprises a first insert member 42 having an optical quality surface 44, and a second insert member 46 located around the first insert member 42. The second insert member 46 can be understood to be a sleeve. In the illustrated embodiment, the optic power insert is a two piece insert having an optical quality surface effective in forming a male ophthalmic lens mold member. For example, the optical quality surface 44 is concave and forms a convex molding surface of an ophthalmic lens mold. In other embodiments, the optic power insert can have an optical quality surface effective in forming a female ophthalmic lens mold member. For example, the optical quality surface can be convex and forms a concave molding surface of an ophthalmic lens mold. As discussed herein, the optical quality surfaces of the present optic power inserts are smooth. For example, the optic power inserts comprise an optical quality surface having a surface roughness amplitude less than fifty nanometers RMS, such as less than forty nanometers RMS, less than twenty nanometers RMS, less than ten nanometers RMS, or even less than about four nanometers RMS.

As discussed herein, the present invention can provide benefits in the production of certain specific types of contact lenses, such as contact lenses with complex structural features or contact lenses formed of expensive chemical materials, where having high yield rates is desirable. For example, the present invention may be effective in the production of toric contact lenses and silicone hydrogel contact lenses, or silicone hydrogel toric contact lenses, among others. Thus, it can be understood that embodiments of the present invention, including combinations of optic power inserts and bushings, can include an optic power insert that comprises an optical quality surface having a toric zone. Thus, a toric zone can be provided on or in an ophthalmic lens mold which can then produce a toric contact lens or a contact lens having a toric optical zone. In embodiments of the present invention, the optic power insert comprises an optical quality surface forming a front curve surface or a back curve surface of a lens mold for a silicone hydrogel contact lens. The silicone hydrogel contact lens can be a spherical contact lens, an aspherical contact lens, and can include a toric optical zone, a rotational stabilization structure, and the like.

Figure 6:
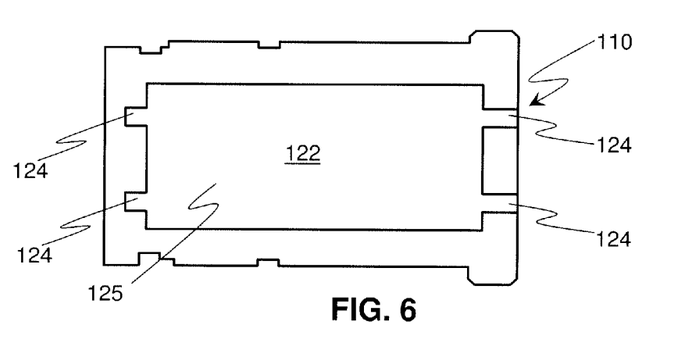
FIG. 6 is an illustration of a sectional view of another optic power insert bushing.

Another embodiment of the present bushings is illustrated in FIG. 6. The bushing of FIG. 6 is similar to the bushing of FIG. 1 where like parts of the bushing are identified by the same reference numbers used in FIGS. 1-4, but increased by 100. For example, FIG. 6 illustrates a bushing 110 that comprises a venting system 122, as described herein. In this embodiment, the venting system 122 comprises a plurality of venting channels 124 and a cavity 125. The channels 124 located near the first end of the bushing 110 direct gas into the cavity 125 and then the gas passes from the cavity 125 out of channels 124 located near the second end of the bushing 110.

Figure 7:
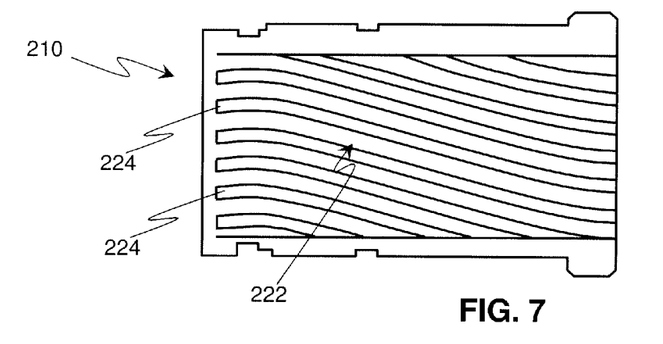
FIG. 7 is an illustration of a sectional view of another optic power insert bushing.

Another embodiment of the present bushings is illustrated in FIG. 7. The bushing of FIG. 7 is similar to the bushing of FIG. 1 where like parts of the bushing are identified by the same reference numbers used in FIGS. 1-4, but increased by 200. For example, FIG. 7 illustrates a bushing 210 that comprises a venting system 222, as described herein. In this embodiment, the venting system 222 comprises a plurality of venting channels 224. The channels 224 are parallel to each other but have a curved configuration instead of being straight or substantially straight channels as shown in FIG. 1.

Figure 8:
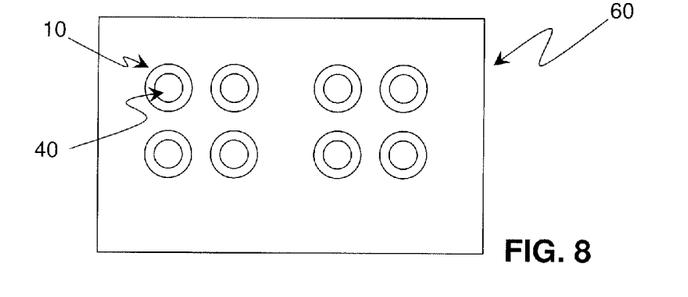
FIG. 8 is a block diagram of an ophthalmic lens mold injection molding system that includes the present optic power insert bushings.

An additional aspect of the present invention also relates to ophthalmic lens mold injection molding systems. As shown in FIG. 8, an ophthalmic lens mold injection molding system 60 comprises one or more of the present optic power insert bushings, such as bushing 10, described herein. In addition, the ophthalmic lens mold injection molding system 60 may also comprise an optic power insert 40 located in each of the bushings. In certain embodiments, the bushings are provided in a plate or frame of the injection molding system. The injection molding system can include other elements, as understood by persons of ordinary skill in the art, and can be provided as a component of an ophthalmic lens manufacturing line.

Another aspect of the present invention relates to methods of producing optic power insert bushings. The present methods comprise a step of forming a venting system in an interior sidewall surface surrounding a bore of the bushing. As described herein, the venting system so formed is effective in directing gas from a first end of the bushing toward a second end of the bushing between an optic power insert located in the bore and the interior sidewall surface. The bushing can be fabricated using any suitable material used for components of ophthalmic lens mold injection molding systems. For example, the bushing can be fabricated from metal materials and the like. The bushings can be machined using conventional methods known to persons of ordinary skill in the art.

In some embodiments, the forming step of the present methods comprises forming a plurality of channels in the interior sidewall surface. For example, embodiments may comprise eroding a portion or portions of the interior sidewall surface to form the venting system or to form the channels. In certain embodiments, the method comprises using electrical discharge machining, wire erosion, or acid erosion to form the venting system. In some embodiments, a diamond tool or laser is used to form the channels.

In some embodiments, including the illustrated embodiment of FIGS. 1-4, the forming step of the present methods comprises forming a plurality of parallel channels extending from near the first end of the bushing to the second end of the bushing, each of the parallel channels having a maximum depth less than about 200 micrometers, as described herein.

The present invention also relates to methods of producing an ophthalmic lens mold or mold member, such as a contact lens mold member. The present methods comprise directing a thermoplastic material into a mold cavity. The mold cavity comprises an optic power insert located in an optic power insert bushing. The bushings and inserts include those described herein. The thermoplastic material forms a molded ophthalmic lens mold member as it cools or hardens. Certain of the present embodiments include a step of removing the molded ophthalmic lens mold member from the mold cavity. The ophthalmic lens mold member can be a female mold member or a male mold member, and can have a variety of shapes and structures. For example, the mold member can have one or more features to permit two mold members to be snap-fit or engaged by an interference fit to form a contact lens mold, or the mold members can have one or more features to permit a contact lens mold to be formed by a contact point instead of an interference fit.

The present invention also relates to methods of producing one or more ophthalmic lenses, such as contact lenses. An example of the present methods comprises providing first and second ophthalmic lens mold members. At least one of the ophthalmic lens mold members is a mold member produced from the mold member production methods described herein. The lens production method further comprises curing a polymerizable lens precursor composition located in an ophthalmic lens shaped cavity defined by the first and second ophthalmic lens mold members to produce a molded ophthalmic lens. As discussed herein, the molded ophthalmic lens produced with the present methods may be a silicone hydrogel contact lens. In addition, or alternatively, the ophthalmic lens may be a toric contact lens, or a contact lens comprising a toric optical zone.

In view of the disclosure herein, it can be appreciated that embodiments of the present invention relate to the use of the present vented bushings in the production of ophthalmic lens molds and molded ophthalmic lenses.

It can also be appreciated that the present invention relates to methods of improving the quality or quality consistency of ophthalmic lens molds, and/or molded ophthalmic lenses. For example, by molding a thermoplastic material into an ophthalmic lens mold member with the present bushings, the amount of acceptable ophthalmic lens molds is increased relative to the amount of ophthalmic lens molds obtained from an injection molding system that includes bushings without venting systems. For example, with the present bushings, it is possible to achieve an acceptability rate of at least about 80%, such as at least about 90%, or even at least about 95% of the ophthalmic lens molds. In other words, at least about 80 of a 100 ophthalmic lens molds meet quality control standards for the ophthalmic lens molds. The increase in the amount of acceptable ophthalmic lens molds can in turn result in an increase in the acceptability rate of contact lenses molded in the ophthalmic lens molds, including silicone hydrogel contact lenses and contact lenses comprising a toric zone.

Although the disclosure herein refers to certain specific embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the additional disclosure.

A number of publications and patents have been cited hereinabove. Each of the cited publications and patents are hereby incorporated by reference in their entireties.

What is claimed is:

1. A method of producing an ophthalmic lens mold, comprising:
    directing a thermoplastic material into a mold cavity to form a molded ophthalmic lens mold, the mold cavity comprising an optic power insert located in an optic power insert bushing, the optic power insert having an external surface, the bushing comprising a first end, a second end, a length extending from the first end to the second end, and a bore surrounded by an interior sidewall surface and structured to accommodate, at least in part, the exterior surface of the optic power insert, the optic power insert and the bushing having a venting system located between the exterior surface of the optic power insert and the interior sidewall surface of the bushing, the venting system comprising a plurality of channels for directing gas out of the mold cavity from the first end of the bushing toward the second end of the bushing.

2. The method of claim 1, further comprising removing the molded ophthalmic lens mold from the mold cavity.

3. A method of producing an ophthalmic lens, comprising:
providing first and second ophthalmic lens mold members, at least one of the mold members being produced by a method comprising directing a thermoplastic material into a mold cavity comprising an optic power insert located in an optic power insert bushing, the bushing comprising a first end, a second end, a length extending from the first end to the second end, a bore surrounded by an interior sidewall surface and structured to accommodate the optic power insert, the insert and bushing having a venting system located between the exterior surface of the insert and the interior sidewall surface of the bushing, the venting system comprising a plurality of channels structured to direct gas out of the mold cavity from the first end of the bushing toward the second end of the bushing; and
curing a polymerizable lens precursor composition located in an ophthalmic lens shaped cavity defined by the first and second ophthalmic lens mold members to produce a molded ophthalmic lens.

4. The method of claim 3, wherein the plurality of channels of the venting system are located in the interior sidewall surface of the bushing.

5. The method of claim 4, wherein each of the plurality of channels has a maximum depth less than 200 micrometers.

6. The method of claim 4, wherein each of the plurality of channels has a maximum depth less than about 20 micrometers.

7. The method of claim 4, wherein each of the plurality of channels has a maximum depth from about 1 micrometer to about 15 micrometers.

8. The method of claim 4, wherein each of the plurality of channels has a maximum depth from about 6 micrometers to about 8 micrometers.

9. The method of claim 4, wherein each of the plurality of channels is located between a first interior sidewall surface and a spaced apart second interior sidewall surface.

10. The method of claim 4, wherein each of the plurality of channels is parallel to each other and extends from near the first end of the bushing to the second end of the bushing.

11. The method of claim 4, wherein the channels are eroded channels formed in the interior sidewall surface.

12. The method of claim 11, wherein the channels are selected from the group consisting of electrical discharge machined channels, wire eroded channels, acid eroded channels, and combinations thereof.

13. The method of claim 3, wherein the optic power insert contacts a portion of the interior sidewall and remains in a laterally fixed position when the optic power insert is located in the bore.

14. The method of claim 3, wherein the optic power insert contacts at least 30% of the surface area of the interior sidewall surface when the optic power insert is located in the bore.

15. The method of claim 3, wherein the optic power insert contacts from about 40% to about 60% of the surface area of the interior sidewall surface when the optic power insert is located in the bore.

16. The method of claim 3, wherein the molded ophthalmic lens is a silicone hydrogel contact lens.

17. The method of claim 3, wherein the molded ophthalmic lens is a contact lens comprising a toric zone.

18. A method of producing an ophthalmic lens, comprising:
providing first and second ophthalmic lens mold members, at least one of the mold members being produced by a method comprising directing a thermoplastic material into a mold cavity comprising an optic power insert comprising an exterior surface located in an optic power insert bushing,
the bushing comprising a first end, a second end, a length extending from the first end to the second end, a bore surrounded by an interior sidewall surface and surrounding, at least in part, the optic power insert, and a venting system structured to direct gas out of the mold cavity from the first end of the bushing toward the second end of the bushing;
wherein the venting system comprises a vent path formed between the interior sidewall surface of the bore of the bushing and the optic power insert to permit gas flow across the interior sidewall surface of the bushing and the exterior surface of the optic power insert from the first end to the second end; and
curing a polymerizable lens precursor composition located in an ophthalmic lens shaped cavity defined by the first and second ophthalmic lens mold members to produce a molded ophthalmic lens.

* * * * *

UNITED STATES PATENT AND TRADEMARK OFFICE
CERTIFICATE OF CORRECTION

PATENT NO. : 8,540,907 B2
APPLICATION NO. : 11/781126
DATED : September 24, 2013
INVENTOR(S) : David Edwards It is certified that error appears in the above-identified patent and that said Letters Patent is hereby corrected as shown below:

In the Claims

Column 14, line 18, claim 17, delete "tonic" and insert -- toric --, therefor.

Signed and Sealed this
Twenty-first Day of October, 2014

Michelle K. Lee
*Deputy Director of the United States Patent and Trademark Office*